(12) United States Patent
Vargantwar et al.

(10) Patent No.: US 8,359,028 B1
(45) Date of Patent: Jan. 22, 2013

(54) MITIGATING THE IMPACT OF HANDOFFS THROUGH COMPARISON OF HISTORICAL CALL LENGTHS

(75) Inventors: Sachin R. Vargantwar, Overland Park, KS (US); Anoop K. Goyal, Overland Park, KS (US); Siddharth S. Oroskar, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 114 days.

(21) Appl. No.: 12/815,709

(22) Filed: Jun. 15, 2010

(51) Int. Cl.
*H04W 4/00* (2009.01)

(52) U.S. Cl. ................. 455/432.1; 455/405; 455/422.1; 455/433; 455/435.1; 455/432.2; 370/332; 370/331; 370/395.3

(58) Field of Classification Search ............... 455/432.2, 455/432.1, 422.1, 405; 370/328–338, 395.3
See application file for complete search history.

(56) References Cited

U.S. PATENT DOCUMENTS

| | | | |
|---|---|---|---|
| 5,369,681 A | 11/1994 | Boudreau et al. | |
| 5,978,463 A | 11/1999 | Jurkevics et al. | |
| 6,055,236 A | 4/2000 | Nessett et al. | |
| 6,069,871 A | 5/2000 | Sharma et al. | |
| 6,181,945 B1 | 1/2001 | Lee | |
| 6,223,042 B1 | 4/2001 | Raffel | |
| 6,243,590 B1 | 6/2001 | Reddy et al. | |
| 6,353,614 B1 | 3/2002 | Borella et al. | |
| 6,353,891 B1 | 3/2002 | Borella et al. | |
| 6,496,867 B1 | 12/2002 | Beser et al. | |
| 6,523,068 B1 | 2/2003 | Beser et al. | |
| 6,556,831 B1 | 4/2003 | Buppelmann | |
| 6,567,405 B1 | 5/2003 | Borella et al. | |
| 6,594,481 B1* | 7/2003 | Johnson et al. | 455/410 |
| 6,643,520 B1 | 11/2003 | Park et al. | |
| 6,697,354 B1 | 2/2004 | Borella et al. | |
| 6,708,219 B1 | 3/2004 | Borella et al. | |
| 6,731,642 B1 | 5/2004 | Borella et al. | |
| 6,745,039 B1 | 6/2004 | Di Lalla | |
| 6,781,982 B1 | 8/2004 | Borella et al. | |
| 6,822,957 B1 | 11/2004 | Schuster et al. | |
| 6,922,561 B2 | 7/2005 | Chen et al. | |

(Continued)

FOREIGN PATENT DOCUMENTS

EP 2 244 502 10/2010

OTHER PUBLICATIONS

Oroskar et al., U.S. Appl. No. 13/044,794, filed Mar. 10, 2011, 51 pages.

(Continued)

*Primary Examiner* — Chuong A Ngo

(57) ABSTRACT

Methods and devices for mitigating the impact of handoffs to non-preferred wireless coverage areas are presented. In particular, a RAN may determine that a first wireless communication device (WCD) and a second WCD are contending for a resource of a preferred wireless coverage area, and that both of the WCDs are likely to be handed off to non-preferred wireless coverage area(s) if they are not granted the resource. Both WCDs may be subscribed to a home wireless service provider that also controls and/or operates the preferred wireless coverage area. The RAN may compare historical call length data of the first WCD with historical call length data of the second WCD. Based on the outcome of this comparison, the RAN may allocate the resource to the WCD that would likely incur higher roaming fees to the home wireless service provider if that WCD were to roam to a non-preferred wireless coverage area.

20 Claims, 5 Drawing Sheets

U.S. PATENT DOCUMENTS

| | | | |
|---|---|---|---|
| 6,963,750 | B1 | 11/2005 | Cheng et al. |
| 6,978,128 | B1 | 12/2005 | Raman et al. |
| 6,996,621 | B1 | 2/2006 | Borella et al. |
| 7,031,275 | B1 | 4/2006 | Borella et al. |
| 7,032,242 | B1 | 4/2006 | Grabelsky et al. |
| 7,065,361 | B1 | 6/2006 | Fortuna |
| 7,171,492 | B1 | 1/2007 | Borella et al. |
| 7,177,658 | B2 | 2/2007 | Willenegger et al. |
| 7,218,618 | B2 | 5/2007 | Greis et al. |
| 7,260,415 | B1 | 8/2007 | Oh |
| 7,286,512 | B1 | 10/2007 | Borella |
| 7,349,699 | B1 | 3/2008 | Kelly et al. |
| 7,366,526 | B2 | 4/2008 | Zhang et al. |
| 7,573,873 | B1 | 8/2009 | Borella et al. |
| 2004/0037264 | A1 | 2/2004 | Khawand |
| 2004/0125768 | A1 | 7/2004 | Yoon et al. |
| 2004/0192306 | A1 | 9/2004 | Elkarat et al. |
| 2006/0058056 | A1 | 3/2006 | Das et al. |
| 2006/0094423 | A1 | 5/2006 | Sharma et al. |
| 2006/0116125 | A1 | 6/2006 | Buckley et al. |
| 2006/0142032 | A1 | 6/2006 | Derakshan et al. |
| 2006/0142051 | A1 | 6/2006 | Purnadi et al. |
| 2006/0160551 | A1 | 7/2006 | Matoba et al. |
| 2006/0274685 | A1 | 12/2006 | Johnson et al. |
| 2007/0053336 | A1 | 3/2007 | Petrovic et al. |
| 2007/0105535 | A1 | 5/2007 | Jacobson et al. |
| 2007/0173252 | A1 | 7/2007 | Jiang |
| 2007/0287414 | A1* | 12/2007 | Dawson et al. ............... 455/405 |
| 2007/0297377 | A1 | 12/2007 | McCann et al. |
| 2008/0025235 | A1 | 1/2008 | Mahany et al. |
| 2008/0032713 | A1 | 2/2008 | Yang |
| 2008/0080427 | A1 | 4/2008 | Suh et al. |
| 2008/0081623 | A1 | 4/2008 | Burgan et al. |
| 2008/0096520 | A1 | 4/2008 | Benco et al. |
| 2008/0293419 | A1 | 11/2008 | Somasundaram et al. |
| 2008/0293437 | A1 | 11/2008 | Ranganathan et al. |
| 2009/0016328 | A1 | 1/2009 | Peisa et al. |
| 2009/0061854 | A1 | 3/2009 | Gillot et al. |
| 2009/0247137 | A1 | 10/2009 | Awad |
| 2009/0257400 | A1 | 10/2009 | Perras |
| 2009/0285113 | A1 | 11/2009 | Yavuz et al. |
| 2010/0120437 | A1 | 5/2010 | Foster et al. |
| 2010/0268674 | A1 | 10/2010 | Dwyer et al. |
| 2010/0311420 | A1 | 12/2010 | Reza et al. |
| 2011/0021197 | A1 | 1/2011 | Ngai |
| 2011/0034167 | A1 | 2/2011 | Ben-Shaul et al. |

OTHER PUBLICATIONS

Vargantwar et al., U.S. Appl. No. 12/815,700, filed Jun. 15, 2010, 41 pages.
Shah et al., U.S. Appl. No. 12/553,661, filed Sep. 3, 2009, 33 pages.
Oroskar et al., U.S. Appl. No. 12/558,359, filed Sep. 11, 2009, 36 pages.
Oroskar et al., U.S. Appl. No. 12/572,829, filed Oct. 2, 2009, 40 pages.
Oroskar et al., U.S. Appl. No. 12/690,629, filed Jan. 20, 2010, 38 pages.
Oroskar et al., U.S. Appl. No. 12/756,027, filed Apr. 7, 2010, 34 pages.
Oroskar et al., U.S. Appl. No. 12/776,287, filed May 7, 2010, 36 pages.
Oroskar et al., U.S. Appl. No. 12/786,174, filed May 24, 2010, 42 pages.
Oroskar et al., U.S. Appl. No. 12/786,184, filed May 24, 2010, 42 pages.
Vondemkamp et al., U.S. Appl. No. 11/535,870, filed Sep. 27, 2006, 29 pages.
Office Action for U.S. Appl. No. 11/535,870, dated Apr. 3, 2009, 14 pages.
Final Office Action for U.S. Appl. No. 11/535,870, dated Nov. 12, 2009, 22 pages.
Advisory Action for U.S. Appl. No. 11/535,870, dated Feb. 18, 2010, 14 pages.
Office Action for U.S. Appl. No. 12/853,730, dated Jan. 18, 2012, 13 pages.
3rd Generation Partnership Project 2 "3GPP2", "Source-Controlled Variable-Rate Multimode Wideband Speech Codec (VMR-WB), Service Options 62 and 63 for Spread Spectrum Systems," 3GPP2 C.S0052-A, Version 1.0, Apr. 22, 2005, 198 pages.
WiMax Forum, "WiMAX End-to-End Network Systems Architecture (State 3: Detailed Protocols and Procedures)," Release 1, V&V Draft, Aug. 8, 2006, 333 pages.
Cai, L. et al., "Mitigating DoS Attacks on the Paging Channel by Efficient Encoding in Page Messages," In: Proceedings of 5th International ICST Conference on Security and Privacy in Communication Networks (SecureComm 2009) Sep. 2009, 20 pages.
TIA Standard, "Interoperability Test Specification for cdma2000® Air Interface," TIA-1036, Section 3.11, Jan. 2005, 4 pages.
TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001, 24 pages.
U.S. Appl. No. 12/261,229, filed Oct. 30, 2008.
Office Action for U.S. Appl. No. 13/044,794 mailed Jul. 18, 2012, 22 pages.
Office action from U.S. Appl. No. 12/815,700, dated Dec. 14, 2011.
Hasswa et al., "Generic Vertical Handoff Decision Function for Heterogeneous Wireless Networks," IFIP Int. Conf. Wireless and Optical Communications Network (WOCN), pp. 239-243 (Mar. 6, 2005).
NTT DoCoMo et al., "IDLE Mode Mobility Control Principles," 3GPP TSG RAN WG2 #59BIS; 3GPP Draft; R2-074001, 8 pages, Oct. 8-12, 2007.
NTT DoCoMo et al., "Load Balancing Solutions for LTE," 3GPP TSG RAN WG2 #58bis; 3GPP Draft; R2-072719, 5 pages, Jun. 22, 2007.
International Search Report and Written Report for PCT/US2012/028070 mailed May 7, 2012, 15 pages.

* cited by examiner

MITIGATING THE IMPACT OF HANDOFFS THROUGH COMPARISON OF HISTORICAL CALL LENGTHS

REFERENCE TO RELATED APPLICATION

This application is related to a co-pending application entitled "Mitigating the Impact of Handoffs through Comparison of Non-Preferred Wireless Coverage Areas," filed on the same day as this application, the entirety of which is hereby incorporated by reference.

BACKGROUND

Wireless service providers typically design their wireless networks to comprise a number of partially-overlapping wireless coverage areas. As a wireless communication device (WCD) that is subscribed to the wireless service provider moves about, these wireless networks may hand off the WCD from one wireless coverage area to another. A goal of performing handoffs is to provide a substantially continuous wireless coverage to the WCD, so that any communication sessions conducted by the WCD are not dropped or degraded due to poor wireless coverage or loss of wireless coverage.

However, it is not economically feasible for any given wireless service provider to deploy perfect wireless coverage. Thus, wireless service providers often partner with other wireless service providers to form roaming agreements. According to these roaming agreements, when a wireless service provider cannot provide a reasonable wireless coverage to a subscribed WCD, the WCD may instead be served by one of the wireless service provider's roaming partners. Consequently, the roaming partner may provide wireless service for the WCD for a period of time, typically until the wireless service provider can once again provide a reasonable wireless coverage for the WCD.

While roaming agreements may result in better overall wireless coverage for WCDs, and therefore a better experience for WCD users, there are drawbacks to letting a WCD roam. One such drawback is that the roaming partner may charge the wireless service provider a fee for each unit of time, unit of data, or transaction that the roaming partner serves a roaming WCD. Another such drawback is that, while roaming, the WCD may not have access to applications and services offered by the wireless service provider.

OVERVIEW

According to the embodiments herein, a wireless service provider may be able to determine when two or more of its subscribed WCDs are likely to roam. Then, the wireless service provider may proactively take steps in an attempt to prevent at least one of these WCDs from roaming. In particular, the wireless service provider may determine that a given WCD of those likely to roam would probably incur higher roaming fees than the other WCDs that are likely to roam. Roaming fees incurred by a WCD subscribed to the wireless service provider may be ultimately charged to the wireless service provider. Thus, in order to potentially reduce these roaming fees, the wireless service provider may allocate resources to the given WCD so that the given WCD is less likely to roam.

In these embodiments, the wireless service provider may control a RAN that provides wireless coverage areas to serve WCDs. The wireless service provider may categorize wireless coverage areas that the wireless service provider controls as "preferred," while categorizing wireless coverage areas that the wireless service provider's roaming partners control as "non-preferred." Use of preferred wireless coverage areas by a WCD subscribed to the wireless service provider typically does not result in the wireless service provider being charged roaming fees, whereas use of non-preferred wireless coverage areas by these WCDs typically does result in the wireless service provider being charged roaming fees.

In order to determine the impact of handing off one or more WCDs to a non-preferred wireless coverage area, the wireless service provider may consider the possible cost and/or performance effects of handing off each of the WCDs, and then pick one or more of the WCDs to hand off, while attempting to continue serve the remaining WCDs via preferred wireless coverage areas.

Accordingly, in a first embodiment, a RAN may make a determination that it will only continue to serve one of two WCDs that are likely to be handed off to non-preferred wireless coverage areas. For instance, the RAN may receive a first call setup request from a first WCD and a second call setup request from a second WCD. In response to receiving the first call setup request and the second call setup request, the RAN may determine that the first WCD and second WCD are contending for a resource of the preferred wireless coverage area. As one example, the preferred wireless coverage area may be heavily utilized with only enough remaining capacity to serve one of the two WCDs. The RAN may further determine, or be aware that, the first WCD is likely to begin roaming to a first non-preferred wireless coverage area if the first WCD is not allocated the resource, and the second WCD is likely to begin roaming to a second non-preferred wireless coverage area if the second WCD is not allocated the resource.

In response to making these determinations, the RAN may compare the first non-preferred wireless coverage area to the second non-preferred wireless coverage area, and as a result of the comparison, assign the resource to one of the WCDs. For instance, the RAN may compare a first cost of allowing the first WCD to roam to the first non-preferred wireless coverage area to a second cost of allowing the second WCD to roam to the second non-preferred wireless coverage area. If the first cost is higher, the RAN may assign the resource to the first WCD, but if the second cost is higher, the RAN may assign the resource to the second WCD. These costs may be per-minute, per-data-unit, or per-transaction costs of allowing the respective WCDs to be served by the respective non-preferred wireless coverage areas. By assigning the resource to the WCD that is likely to incur the greatest roaming cost charged to the wireless service provider, the wireless service provider may reduce its roaming fees.

In a second embodiment, the RAN may also make a determination that it will only continue to serve one of two WCDs that are likely to be handed off to non-preferred wireless coverage areas. However, in this embodiment, the RAN may consider historical call length data for each WCD when choosing which WCD to allocate a resource.

Like in the first embodiment, the RAN may receive a first call setup request from a first WCD and a second call setup request from a second WCD. In response to receiving the first call setup request and the second call setup request, the RAN may further determine that the first WCD and second WCD are contending for a resource of the preferred wireless coverage area. The RAN may also determine, or be aware that, the first WCD is likely to begin roaming to a first non-preferred wireless coverage area if the first WCD is not allocated the resource, and the second WCD is likely to begin roaming to a second non-preferred wireless coverage area if the second WCD is not allocated the resource.

In response to determining that the first WCD and second WCD are contending for a resource of the preferred wireless coverage area, the RAN may compare historical call length data of the first WCD to historical call length data of the second WCD. Based on a result of the comparison, the RAN may allocate the resource to one of the two WCDs. Comparing the historical call length data of the first WCD to the historical call length data of the second WCD may involve comparing some statistical measure, such as an average value or a median value, of each WCD's respective historical call length data. For instance, if the first WCD has a longer historical average call length than the second WCD, then the first WCD may be more likely to engage in longer calls in the future. Based on this observation, the RAN may assign the resource to the first WCD, so that the wireless service provider is likely to incur lower roaming fees.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

DESCRIPTION

Disclosed herein are methods and devices for mitigating the impact of handoffs to non-preferred wireless coverage areas. By employing the various embodiments herein, a wireless service provider may be able to reduce the roaming fees that it is charged by other wireless service providers (i.e., roaming partners) when the wireless service provider's subscribed WCDs use wireless coverage areas under the control of these other wireless service providers.

I. NETWORK ARCHITECTURE

Figure 1:
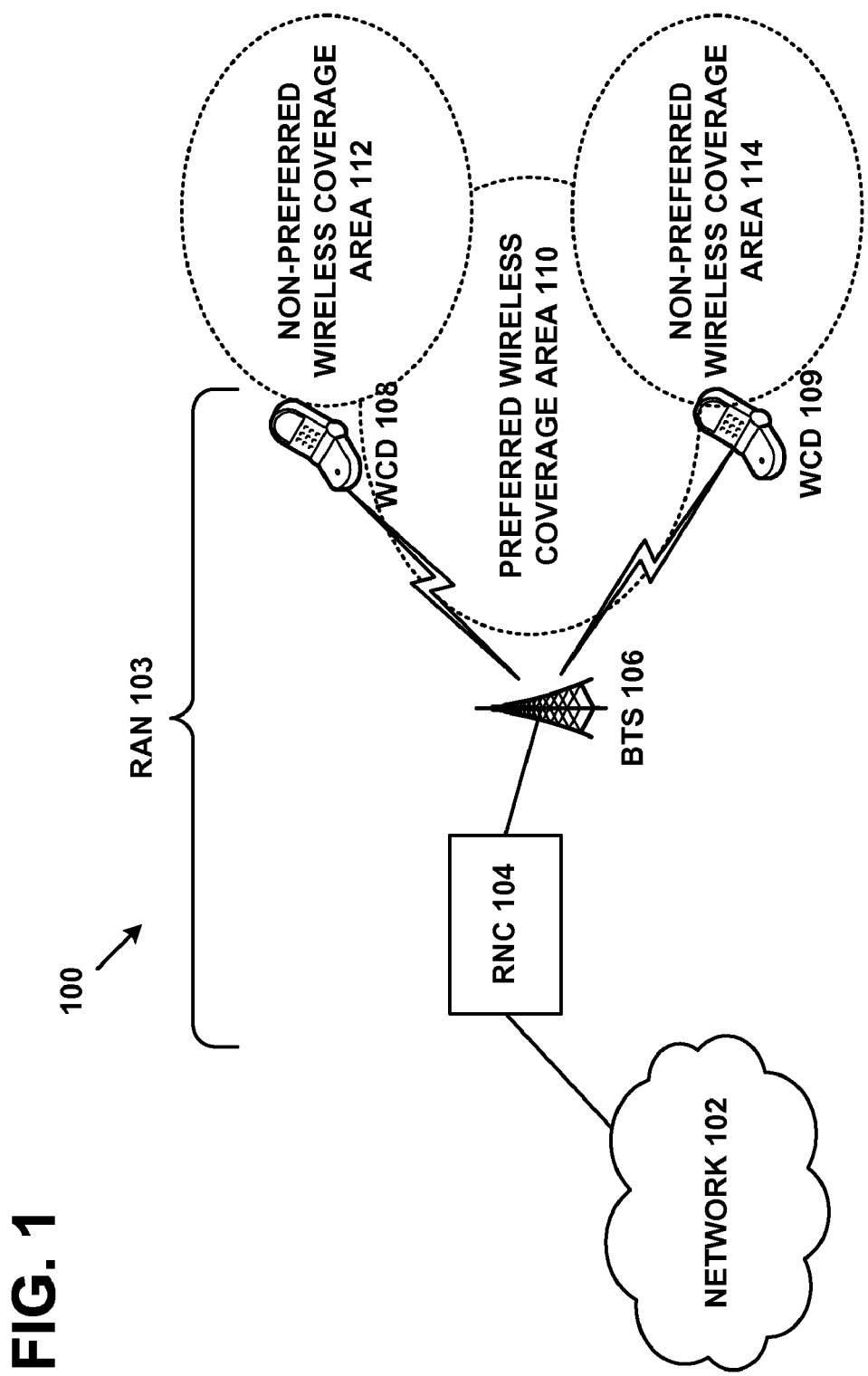
FIG. 1 depicts a RAN controlling a preferred wireless coverage area that is within range of at least two non-preferred wireless coverage areas, in accordance with an example embodiment.

FIG. 1 depicts an example communication system 100 in which these embodiments can be carried out or deployed. At a high level, communication system 100 comprises a network 102, a RAN 103, a preferred wireless coverage area 110, and non-preferred wireless coverage areas 112 and 114. Any of the wireless coverage areas may provide wireless communication services to WCD 108 and/or WCD 109.

Network 102 is preferably a packet-switched or circuit-switched communication network that links RAN 103 to other networks, devices, applications, and/or services. Network 102 may be, for instance, the Internet, a private IP network, the public-switched telephone network (PSTN) or a private circuit-switched network. Network 102 may comprise one or more switches, gateways, routers, signaling nodes, application servers, and/or other types of devices, systems and networks.

RAN 103 may include a radio network controller (RNC) 104, and a base transceiver station (BTS) 106. For sake of simplicity, FIG. 1 excludes some components that could be found in a RAN, such as mobile switching centers (MSCs), softswitches, media gateways, media gateway controllers, signaling nodes, authentication servers, and so on. BTS 106 may radiate on one or more frequencies to define preferred wireless coverage area 110. Preferred wireless coverage area 110, may, in turn, serve WCD 108 and/or WCD 109. To supply wireless service to these WCDs, as well as other WCDs, preferred wireless coverage area 110 may include an air interface that comprises one or more forward link and/or reverse link channels. These channels may be formed via a set of orthogonal Code Division Multiple Access (CDMA) codes, each of which may be used to modulate the data transmitted on a particular channel.

The forward link channels, which carry data from BTS 106 to WCD 108 and from BTS 106 to WCD 109, may include a pilot channel, over which a phase offset pattern is repeatedly transmitted, a sync channel over which synchronization data, such as a timing reference, is transmitted, and traffic channels over which bearer traffic directed to WCD 108 and/or WCD 109 is transmitted. Additionally, one or more of the forward link CDMA codes may be designated as primary and/or secondary paging channels, used for contacting WCDs.

The reverse link channels may also be formed through the use of CDMA. These reverse link channels may include, for example, an access channel for responding to paging messages, and reverse traffic channels for transmitting bearer traffic from WCD 108 to BTS 106 and from WCD 109 to BTS 106. Thus, through the forward and reverse link channels, BTS 106 and WCD 108 and/or WCD 109 may exchange signaling and bearer traffic.

Of course, CDMA is not the only technology that can provide wireless forward and reverse link channels, and other technologies may be used instead. These other technologies include, but are not limited to, Worldwide Interoperability for Microwave Access (WIMAX®), Universal Mobile Telecommunications System (UMTS®), Long Term Evolution (LTE®) IDEN®, or 802.11 (Wifi). Thus, RAN 103 may operate according to one or more of CDMA, any of these other technologies, and/or additional technologies now known or developed in the future.

Along with performing other tasks, RNC 104 may manage the wireless resources associated with BTS 106, and route traffic to and from BTS 106. Further, RNC 104 may be able to facilitate handoff of WCD 108 and/or WCD 109 from one wireless coverage area to another (e.g., from preferred wireless coverage area 110 to one of the non-preferred wireless coverage areas). In addition to or instead of an RNC such as RNC 104, a base station controller (BSC), or some other type of device, may be used to control the operation of BTS 106. Regardless of the exact configuration, RNC 104 may be communicatively coupled to network 102 either directly or via one or more links or other devices. For instance, RNC 104 may communicate with network 102 via an access gateway (not shown), such as a packet data serving node (PDSN) or an access serving network gateway (ASN-GW).

WCD 108 and WCD 109 may be two of potentially many WCDs served by preferred wireless coverage area 110. Such a WCD could be a wireless telephone, a wireless personal digital assistant, a wirelessly equipped laptop computer, a wireless router, or another type of mobile or fixed wireless device. Preferably, a WCD is a subscriber device that is manipulated by a human in order to establish circuit-switched or packet-switched voice and/or data calls. However, a WCD could also be an automated device without a human interface.

A WCD may be associated with zero or more RANs at a time and may use the wireless coverage areas of these RANs to communicate, via network 102, with correspondent nodes, such as web servers, gaming servers, short message service (SMS) servers, signaling and media nodes used to support real time protocols, and other WCDs. Thus, a WCD may be in communication with one or more preferred and/or non-preferred wireless coverage areas simultaneously, even if the WCD is only using one of these wireless coverage areas to communicate with the correspondent nodes. As a result, the WCD may be receiving forward link signals from each of these wireless coverage areas.

Regularly, or from time to time, the WCD may measure the signal-to-noise ratio (SNR) and/or the frame error rate (FER) of a channel from each of these wireless coverage areas, to determine the respective received signal strengths of each wireless coverage area. A group of wireless coverage areas that a given WCD is receiving signals from may be referred to as the "active set" of the WCD. However, a WCD may also receive signals from wireless coverage areas not in the active set. Maintaining communication with multiple wireless coverage areas simultaneously may provide advantages for a WCD, such as making handoffs faster and less disruptive.

To that point, when a WCD determines that the received signal strength of its serving wireless coverage area has dropped below a signal-strength threshold, or the received signal strength of another wireless coverage area in the active set exceeds that of the serving wireless coverage area by some amount, the WCD may request a handoff from the serving wireless coverage area to a wireless coverage area from which the WCD has received a higher signal strength. Additionally, the WCD may add or remove wireless coverage areas from the active set based on these signal strengths or for other reasons.

Preferred wireless coverage area 110 may be defined by BTS 106 radiating on one or more frequencies. Similarly, non-preferred wireless coverage areas 112 and 114 may be defined by BTSs under the control of other entities radiating on one or more frequencies. The frequencies used to define each of these wireless coverage areas may be non-overlapping in order to reduce interference. Alternatively, the frequencies used by these wireless coverage areas may overlap with one another to some extent. Although three wireless coverage areas are shown in FIG. 1, the embodiments herein may make use of more or fewer wireless coverage areas. For example, RAN 103 may radiate to define more than one preferred wireless coverage area. Similarly, there may be only one, or more than two non-preferred wireless coverage areas. While FIG. 1 depicts the physical coverage of preferred wireless coverage area 110 partially overlapping with that of non-preferred wireless coverage areas 112 and 114, preferred wireless coverage area 110 may overlap with these non-preferred wireless coverage areas more or less than is shown. Thus, for instance, preferred wireless coverage area 110 may fully overlap or not overlap at all with one or more of non-preferred wireless coverage areas 112 and 114.

It should be understood that FIG. 1 is presented merely for purposes of example. Therefore, communication network 100 may comprise more or fewer components in different arrangements than shown. Further, each of these devices, such as RNC 104 and BTS 106, may include multiple physical or logical components arranged to operate in conjunction with one another. On the other hand, these devices may be able to be combined with one another into a smaller number of logical or physical devices. In sum, changes may be made to the arrangement illustrated by FIG. 1 without departing from the scope of the invention.

II. RAN COMPONENT EMBODIMENT

Figure 2:
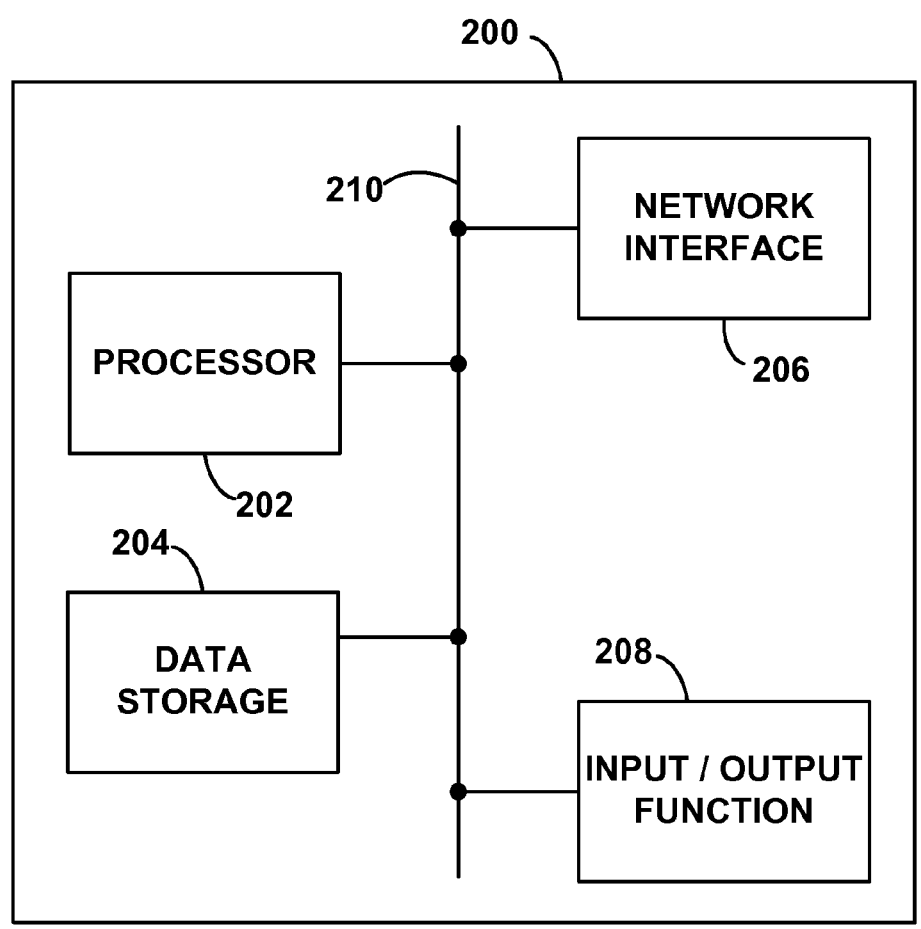
FIG. 2 is a block diagram of a RAN component, in accordance with an example embodiment.

FIG. 2 is a simplified block diagram exemplifying a RAN component 200, illustrating some of the functional components that would likely be found in a RAN component arranged to operate in accordance with the embodiments herein. Example RAN component 200 could be any type of device found in or associated with a RAN, such as a BTS or RNC. For purposes of simplicity, this specification may equate RAN component 200 to an RNC from time to time. Nonetheless, it should be understood that the description of RAN component 200 could apply to any component used for the purposes described herein.

Example RAN component 200 preferably includes a processor 202, a data storage 204, a network interface 206, and an input/output function 208, all of which may be coupled by a system bus 210 or a similar mechanism. Processor 202 preferably includes one or more CPUs, such as one or more general purpose processors and/or one or more dedicated processors (e.g., application specific integrated circuits (ASICs) or digital signal processors (DSPs), etc.)

Data storage 204, in turn, may comprise volatile and/or non-volatile data storage and can be integrated in whole or in part with processor 202. Data storage 204 preferably holds program instructions, executable by processor 202, and data that is manipulated by these instructions to carry out the various methods, processes, or functions described herein. (Alternatively, these methods, processes, or functions can be defined by hardware, firmware, and/or any combination of hardware, firmware and software.) By way of example, the data in data storage 204 may contain program instructions executable by processor 202 to carry out any of the methods, processes, or functions disclosed in this specification or the accompanying drawings.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example RAN component 200. Input/output function 208 may comprise multiple types of input devices, such as a keyboard, a mouse, a touch screen, and so on. Similarly, input/output function 208 may comprise multiple types of output devices, such as a monitor, printer, or one or more light emitting diodes (LEDs). Additionally or alternatively, example RAN component 200 may support remote access from another device, via network interface 206 or via another interface (not shown), such an RS-232 or USB port.

III. ROAMING AGREEMENTS BETWEEN WIRELESS SERVICE PROVIDERS

Turning back to FIG. 1, each WCD may be subscribed to, or otherwise associated with, a wireless service provider. Therefore, for instance, WCD 108 and WCD 109 may be subscribed to the wireless service provider that controls and/ or operates preferred wireless coverage area 110. (For sake of clarity, hereinafter this wireless service provider will be referred to as the "home wireless service provider.") One way in which these subscriptions could be established is that a user of one of these WCDs may purchase or lease their WCD from the home wireless service provider. Then, for pre-determined fees, the WCD may be used to communicate via any of the home wireless service provider's wireless coverage areas. Alternatively, a user of the WCD may purchase or lease the WCD from a third-party entity, such as a wholesaler or reseller, and then register the WCD for service with the home wireless service provider.

In most cases, as noted above, it is not economically feasible for any given wireless service provider to deploy perfect wireless coverage. For instance, even a nationwide wireless service provider may not provide wireless coverage areas in sparsely-populated rural locations, or even to some urban or suburban locations. Also, in some circumstances, the signals from a wireless coverage area may not penetrate very far into buildings, leaving coverage gaps in these structures. Additionally, a wireless service provider may not be able to provide service to a WCD in a given location if the wireless service provider's wireless coverage areas are near or at full capacity in that location.

Thus, wireless service providers often partner with other wireless service providers to form roaming agreements. According to these roaming agreements, when a wireless service provider cannot provide a reasonable wireless coverage to a WCD, the WCD may instead be served by one of the wireless service provider's roaming partners. Consequently, the roaming partner provides wireless service to the WCD for a period of time, typically until the wireless service provider can once again provide a reasonable wireless coverage to a WCD.

Roaming partners may be wireless service providers in their own right, and therefore may also serve their own subscribed WCDs. In FIG. 1, non-preferred wireless coverage areas 112 and 114 may be controlled and/or operated by one or more roaming partners of the home wireless service provider. Thus, non-preferred wireless coverage areas 112 and 114 may each be controlled and/or operated by the same roaming partner or by different roaming partners.

It may be advantageous for the home wireless service provider to have one or more roaming partners, because allowing WCD 108 and/or WCD 109 to use these roaming partners' wireless service areas may increase the overall wireless coverage available to WCD 108 and/or WCD 109. However, roaming agreements between wireless service providers often involve the assessment of fees. For example, a roaming partner of the home wireless service provider may charge the home wireless service provider when WCD 108 or WCD 109 uses one or more of the roaming partner's wireless coverage areas. Typically, no fees are charged if a roaming WCD is idle. But, if the roaming WCD makes a substantial use of the roaming partner's wireless coverage area(s), the home wireless service provider may be charged for that use. Such a substantial use might include, for example, making a voice or data call, or sending or receiving a text or multimedia message.

The fee for this use may be assessed on a per-time-unit, per-data-unit, per transaction basis, or some other basis. Thus, for example, if a WCD participated in a voice or data call while roaming, a fee may be assessed based on the number of minutes (or fractions of minutes) that the call lasted (e.g., three cents per minute). Alternatively, the fee may be based on the amount of data transferred to and/or from the WCD during the course of the call (e.g., twenty-five cents per megabyte of data sent or received by the WCD). For some applications or services, such as text or multimedia messaging, fees may be assessed on a per-transaction basis (e.g., ten cents per text message).

While the home wireless service provider can pass on some or all of these roaming fees to the user of the WCD, it still may be advantageous for the home wireless service provider to try to avoid having at least some subscribed WCDs roam. Alternatively, if roaming cannot reasonably be avoided, it may be advantageous for the home wireless service provider to mitigate the impact of the roaming. In other words, the home wireless service provider may be able to manage the roaming of subscribed WCDs such that roaming fees are reduced. The effect of doing so may be lower costs paid by users, resulting in higher user satisfaction with the home wireless service provider.

IV. CONTROLLING RESOURCE ALLOCATION

The capacity of a given wireless coverage area, such as preferred wireless coverage area 110, may be thought of in terms of the utilization of the wireless coverage area's resources. Depending how the wireless coverage area is arranged, these resources may include frequencies, bandwidth, spectrum, channels, and other aspects of electromagnetic communication technologies. If the forward link or reverse link of the wireless coverage area uses CDMA, then the CDMA codes that are used to form channels or assigned to WCDs may also be considered resources. Similarly, if the forward link or reverse link of the wireless coverage area uses time-division multiple access (TDMA), then each time slot on one of these links may be considered a resource. Further, any combination of frequencies, bandwidth, spectrum, channels, time slots, or codes can also be considered to be a resource. Additional resources may include the processor utilization, memory utilization, and/or input/output utilization of a device such as RNC 104 or BTS 106.

At any one time, a wireless coverage area may be oversubscribed, in that more WCDs may be registered with the wireless coverage area than the wireless coverage area has resources to simultaneously serve. Since WCDs are typically idle more frequently than they are active, and active WCDs utilize the majority of the resources, such oversubscription does not imply that all of the wireless coverage area's resources are in use. However, there may be occasions where a wireless coverage area has insufficient resources to simultaneously serve all WCDs that request service.

For instance, suppose that preferred wireless coverage area 110 uses CDMA. Thus, RAN 103 may allocate one or more CDMA codes to each active WCD. However, there may be a finite number of CDMA codes per wireless coverage area. Thus, if RAN 103 has allocated all but one CDMA code of preferred wireless coverage area 110 to WCDs, and two WCDs both seek to begin communicating via preferred wireless coverage area 110, RAN 103 may only be able to serve one of these two WCDs.

Figure 3:
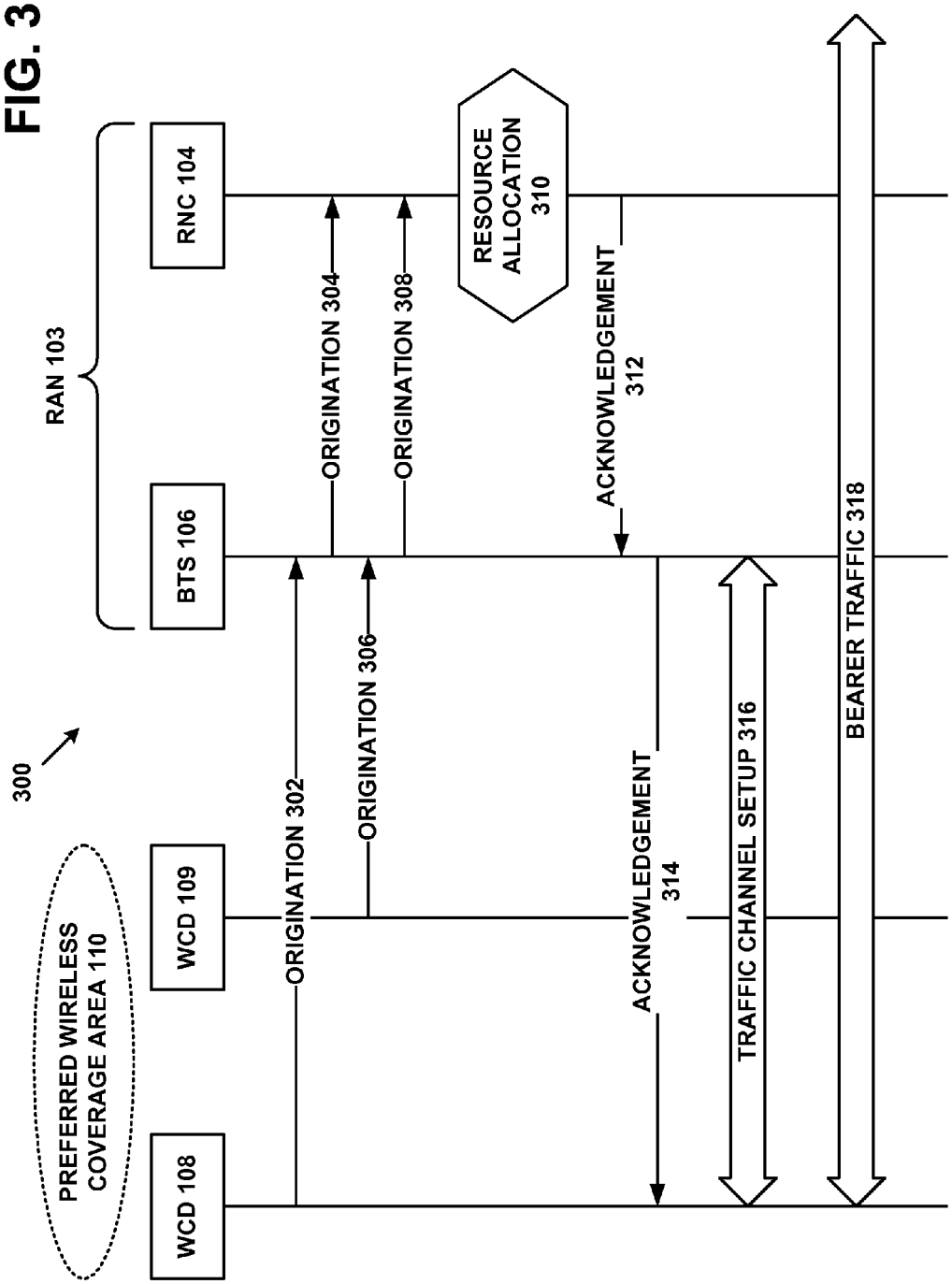
FIG. 3 is a message flow of two WCDs attempting to establish calls in a preferred wireless coverage area, in accordance with an example embodiment.

To that point, FIG. 3 is a call flow 300 of RAN 103 allocating a traffic channel resource of preferred wireless coverage area 110 to one of two WCDs contending for this resource. At step 302, WCD 108 requests a traffic channel resource by transmitting an origination message to BTS 106. At step 304, BTS 106 transmits the origination message to RNC 104. Similarly, at step 306, WCD 109 requests a traffic channel resource also by transmitting an origination message to BTS 106, and BTS 106 transmits this origination message to RNC 104 at step 308.

At step 310, RNC 104 performs resource allocation. In particular, RNC 104 may determine how many free traffic channel resources are available in preferred wireless coverage area 110. In this example scenario, RNC 104 determines that it will only be able to allocate a traffic channel resource to WCD 108. One possible reason that may lead RNC 104 to make this determination is if preferred wireless coverage area 110 only has free traffic channel resources to serve one WCD. In this case, RNC 104 may choose to serve WCD 108 based on RNC 104 receiving origination message 304 before receiving origination message 308. Alternatively, as will be described in further detail, RNC 104 may make this determination based on other factors.

Another possible scenario that may lead RNC 104 to make this determination is if the traffic channel resource utilization of preferred wireless coverage area 110 is above a particular threshold. For instance, if 90% or more of these traffic channel resources are already allocated, RNC 104 may judiciously allocate the remaining 10%. RNC 104 might reserve this remaining capacity only for WCDs subscribed to a premium service level, in the process of making high-priority calls, or that are likely to roam if not otherwise granted the traffic channel resources.

If, for example, preferred wireless coverage area 110 operates in accordance with CDMA, each traffic channel of preferred wireless coverage area 110 may be associated with a unique CDMA code. Thus, in order to allocate a traffic channel to a WCD, RNC 104 may allocate a CDMA code to the WCD. However, in such a system, there may be a limited number of codes—perhaps only 64 or 128. Therefore, if preferred wireless coverage area 110 has only one CDMA code remaining unallocated, or if preferred wireless coverage area 110 has several CDMA codes remaining unallocated but will only allocate these codes judiciously, preferred wireless coverage area 110 may not be able to serve all WCDs that request service.

Accordingly, at step 310, RNC 104 may allocate a free traffic channel resource to WCD 108 instead of allocating this resource to WCD 109. Then, at step 312, RNC 104 may transmit an acknowledgement to BTS 106. Additionally, at step 314, BTS 106 may transmit the acknowledgement to WCD 108. In response to receiving this acknowledgement, WCD 108 and BTS 106 may engage in traffic channel setup, at step 316, to establish one or more traffic channels for WCD 108 to use. Once these traffic channels are set up, at step 318, WCD 108 may use the traffic channels to transmit and/or receive bearer traffic.

As shown, RNC 104 may refrain from replying to the origination message from WCD 109, thus implicitly denying service to WCD 109. Alternatively, and not shown, RNC 104 may transmit a negative acknowledgment to WCD 109, thereby explicitly denying service to WCD 109. In response to not being allocated the resource, WCD 109 may scan a number of frequencies seeking a new wireless coverage area that may have resources that WCD 109 might be able to use. This new wireless coverage area may be a different preferred wireless coverage area that is controlled by the home wireless service provider, or a non-preferred wireless coverage area, such as non-preferred wireless coverage area 114.

While FIG. 3 depicts one embodiment of how a RAN might allocate resources to one WCD over another WCD, this goal may be achieved in various other ways. For example, call flow 300 may contain more or fewer steps, and these steps may occur in a different order. Further, the particular message names used in call flow 300 are not important, and messages with different names may be used. Moreover, methods for allocating different types of resources may use similar or different call flows. Additionally, call flow 300 may be generalized to allocating m resources to n WCDs, where n is preferably greater than m.

V. MITIGATING THE IMPACT OF ROAMING BY CONSIDERING THE COST OF ROAMING

Regardless of the exact resources that two or more WCDs are contending for, it may be advantageous for a RAN to allocate these resources to WCDs in such a way that roaming fees are reduced. At a high level, if WCD 108 and WCD 109 are contending for a resource of preferred wireless coverage area 110, RAN 103 may consider what could happen if either WCD 108 or WCD 109 is not allocated the requested resource. Thus, RAN 103 might look to the possible effects of denying either WCD's requested resource allocation. In particular, RAN 103 might consider whether one of the WCDs might roam to a non-preferred wireless coverage area if that WCD's resource allocation request is denied.

Turning once again to FIG. 1, in communication system 100, non-preferred wireless coverage areas 112 and 114 may be adjacent to, or at least partially overlapping with, preferred wireless coverage area 110. Thus, as depicted in FIG. 1, WCD 108 may be within the physical coverage of both preferred wireless coverage area 110 and non-preferred wireless coverage area 112. Therefore, if WCD 108 is denied allocation of any requested resources in preferred wireless coverage area 110, WCD 108 may be handed off to non-preferred wireless coverage area 112 so that WCD 108 can attempt to acquire the resources from this wireless coverage area. Similarly, WCD 109 may be within the physical coverage of both preferred wireless coverage area 110 and non-preferred wireless coverage area 114. Thus, if WCD 109 is denied allocation of any requested resources in preferred wireless coverage area 110, WCD 109 may be handed off to non-preferred wireless coverage area 114.

As noted above, non-preferred wireless coverage areas 112 and 114 may be controlled and/or operated by the same or different roaming partners of the home wireless service provider. Consequently, the roaming fees charged when a WCD subscribed to the home wireless service provider roams to each of these wireless coverage areas may differ. For instance, the home wireless service provider may be charged eight cents per minute if WCD 108 engages in calls when roaming to non-preferred wireless coverage area 112. However, the home wireless service provider may be charged only three cents per minute if WCD 109 engages in calls when roaming to non-preferred wireless coverage area 114. Therefore, under these conditions, the home wireless service provider is likely to reduce roaming fees if it allocates resources to WCD 108 over WCD 109 when these two WCDs are contending for resources, and the WCDs are likely to be handed off as described above.

In this scenario, it may be useful for RAN 103 to be capable of determining that WCD 108 and WCD 109 are likely to be handed off to non-preferred wireless coverage areas 112 and 114, respectively. Such a determination may involve RAN 103 discovering the approximate physical locations of WCD 108 and WCD 109 and comparing these locations to the physical coverage provided by each of non-preferred wireless coverage areas 112 and 114.

There are a number of ways in which RAN 103 can determine, approximate, or otherwise become aware of each WCD's physical location. One way is for each WCD to inform RAN 103 of the power at which the respective WCD receives forward-link signals from preferred wireless coverage area 110. As this power decreases, it becomes more likely that the respective WCD is further from BTS 106. Each WCD may also inform RAN 103 of the power at which the respective WCD receives forward-link signals from non-preferred wireless coverage areas 112 and 114. RAN 103 may then compare each WCD's received signal strengths to attempt to determine if one or both of the WCDs are likely to be handed off. For example, if WCD 108 is receives a pilot channel signal strength from non-preferred wireless coverage area 112 at a substantially greater power than WCD 108 receives a pilot channel signal strength from preferred wireless coverage area 110, WCD 108 may be likely to hand off to non-preferred wireless coverage area 112.

Alternatively, the WCDs may transmit representations of their respective latitudinal and longitudinal coordinates (e.g., global positioning system coordinates) to RAN 103. RAN 103 may also have access to coverage information (e.g., map-like representations) of the physical wireless coverage of preferred wireless coverage area 110 and non-preferred wireless coverage areas 112 and 114. From these coordinates and the coverage information, RAN 103 may be able to determine when either WCD is likely to be handed off. Thus, using either of these methods, or additional methods not described herein, RAN 103 may be able to determine whether a WCD is likely to be handed off to a non-preferred wireless coverage area.

Figure 4:
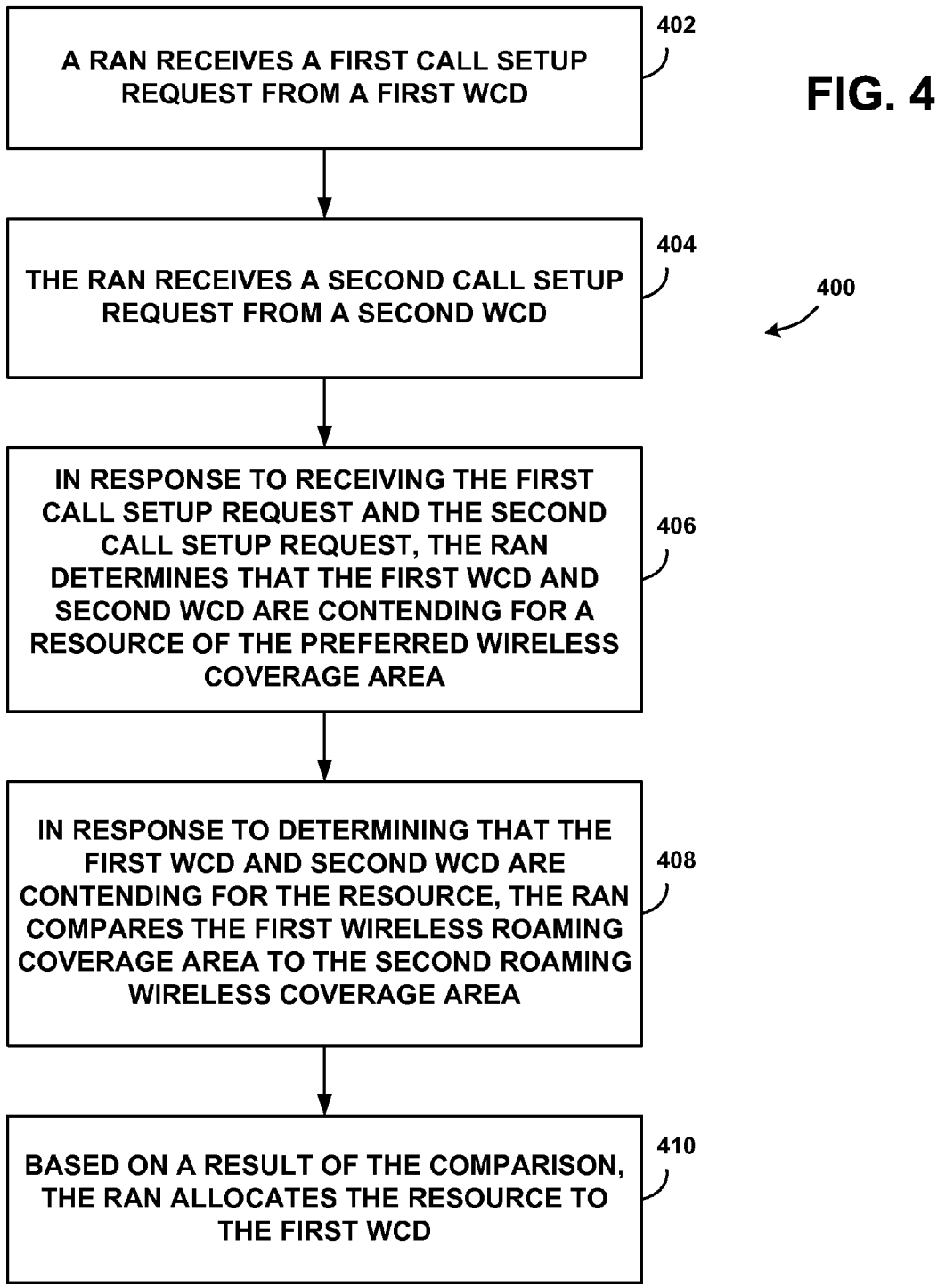
FIG. 4 is a first flow chart, in accordance with an example embodiment.

FIG. 4 is a flow chart 400 of a method through which a RAN may be able to reduce roaming fees. The RAN may provide a preferred wireless coverage area to serve WCDs, and the preferred wireless coverage area may be controlled and/or operated by a wireless service provider to which a first WCD and a second WCD are subscribed. At step 402, the RAN may receive a first call setup request from the first WCD. Similarly, at step 404, the RAN may receive a second call setup request from the second WCD. The call setup requests may involve the first and second WCD transmitting respective origination messages to the RAN, or may incorporate the use of other messages or techniques.

At step 406, in response to receiving the first and second call setup requests, the RAN may determine that the first WCD and second WCD are contending for a resource of the preferred wireless coverage area. This resource may be any type of resource that could be involved in providing wireless service to a WCD, such as frequencies, bandwidth, spectrum, channels, CDMA codes, time slots, or some combination thereof. Further, this resource may be the only resource of a given type that is available in the wireless coverage area. Alternatively, this resource may be one of a plurality of resources of the given type available in the wireless coverage area.

Preferably, the first WCD is likely to begin roaming to a first non-preferred wireless coverage area if the first WCD is not allocated the resource, and the second WCD is likely to begin roaming to a second non-preferred wireless coverage area if the second WCD is not allocated the resource. The first non-preferred wireless coverage area may be controlled by a first wireless service provider, and the second non-preferred wireless coverage area may be controlled by a second wireless service provider.

At step 408, in response to determining that the first WCD and second WCD are contending for the resource, the RAN may compare the first non-preferred wireless coverage area to the second non-preferred wireless coverage area. This comparison may involve further comparing a first cost of allowing the first WCD to roam to the first non-preferred wireless coverage area to a second cost of allowing the second WCD to roam to the second non-preferred wireless coverage area. If the result of the comparison is that the first cost is higher than the second cost, then the RAN may allocate the resource to the first WCD, as shown in step 410. However, if the result of the comparison is that the first cost is lower than the second cost, then the RAN may allocate the resource to the second WCD. The first cost and the second cost may be per-time-unit, per-data-unit, per-transaction costs, or some other types of costs.

In addition or as an alternative to comparing the costs of allowing either WCD to roam, the RAN may compare a first set of services offered via the first non-preferred wireless coverage area to a second set of services offered via the second non-preferred wireless coverage area. These services may include, for example, support of data calls, text or multimedia messaging, voice over IP, and push to talk, as well as any other type of service. Presumably, the preferred wireless coverage area provides both the first set and the second set of services.

If the result of the comparison is that the first set of services does not include at least some services typically used by the first WCD, then the RAN may allocate the resource to the first WCD so that the first WCD can benefit from using the first set of services via the preferred wireless coverage area. Conversely, if the result of the comparison is that the second set of services does not include at least some services typically used by the second WCD, then the RAN may allocate the resource to the second WCD so that the second WCD can benefit from the second set of services via the preferred wireless coverage area.

If the both the first and second sets of services are at least partially supported by the respective wireless coverage areas, then the RAN may weigh the level of support for each set in order to determine whether to allocate the resource to the first WCD or to the second WCD. If neither set of services is supported, then the RAN may use other factors to determine which WCD to assign the resource.

If the resource is allocated to the first WCD, the RAN may transmit a call setup success response to the first WCD. This response may be a message similar to the acknowledgement of step 314, or the response may take some other form. Further, after allocating the resource to the first WCD, the RAN may hand off the second WCD to the second non-preferred wireless coverage area (e.g., the RAN may stop serving the second WCD, and therefore cause the second WCD to begin roaming).

VI. MITIGATING THE IMPACT OF ROAMING BY CONSIDERING HISTORICAL CALL LENGTH DATA

Comparing the potential cost of allowing the first WCD to roam to the first non-preferred wireless coverage area to the potential cost of allowing the second WCD to roam to the second non-preferred wireless coverage area may enable the home wireless service provider to assign resources in order to reduce the roaming fees. However, if these two costs are substantially identical, or at least similar, the RAN may turn to other factors when determining which WCD to allocate the resource. One of these factors may be the historical call length of each WCD.

Preferably, a wireless service provider records information about each call that takes place in its wireless network with a call detail record (CDR). A voice CDR may identify a caller device and a callee device, as well as the start and stop times of the call. A data CDR may identify the caller device, one or more destination addresses, the call's duration, and a volume of data sent and/or received. Both types of CDRs may include additional information as well. Thus, the home wireless service provider may have access to a plurality of CDRs for both WCD 108 and 109. From these CDRs, historical call length data of each WCD may be gathered. This historical call length may be only for calls made within the home wireless service provider's wireless coverage areas, roaming partner wireless coverage areas, or both.

Figure 5:
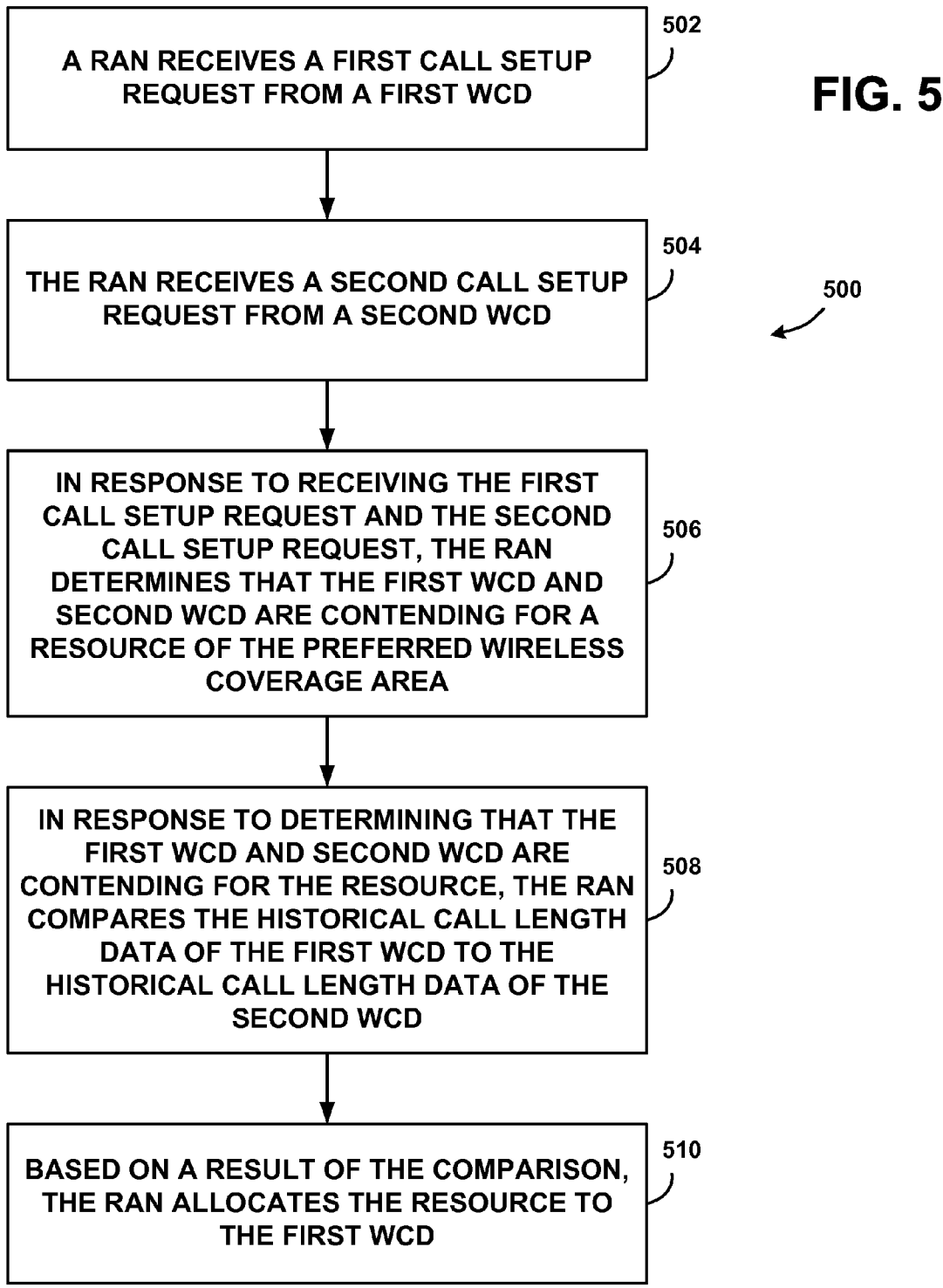
FIG. 5 is a second flow chart, in accordance with an example embodiment.

FIG. 5 is a flow chart 500 of a method through which a RAN may be able to reduce roaming fees based on the historical call length of WCDs. The RAN may provide a preferred wireless coverage area to serve WCDs, and the preferred wireless coverage area may be controlled and/or operated by a wireless service provider to which a first WCD and a second WCD are subscribed. At step 502, the RAN may receive a first call setup request from the first WCD. Similarly, at step 504, the RAN may receive a second call setup request from the second WCD. The call setup requests may involve the first and second WCD transmitting respective origination messages to the RAN, or may involve the use of other messages or techniques.

At step 506, in response to receiving the first and second call setup requests, the RAN may determine that the first WCD and second WCD are contending for a resource of the preferred wireless coverage area. Similar to the resource of call flow 400, this resource may be any type of resource that could be involved in providing wireless service to a WCD. Additionally, this resource may be the only resource of a given type that is available in the wireless coverage area. Alternatively, this resource may be one of a plurality of resources of the given type available in the wireless coverage area.

Also, the RAN may determine that the first WCD is likely to begin roaming to a first non-preferred wireless coverage area if the first WCD is not allocated the resource, while the second WCD is likely to begin roaming to a second non-preferred wireless coverage area if the second WCD is not allocated the resource. The first and the second wireless coverage areas may be controlled and/or operated by the same or different roaming partners of the home wireless service provider. Moreover, the first and second wireless coverage area may be the same wireless coverage area.

The RAN may further determine that the first and second non-preferred wireless coverage areas are approximately equally preferable to one another. For instance, the roaming fees that would be incurred by the first WCD making use of the first wireless coverage area might be approximately the same as the roaming fees that would be incurred by the second WCD making use of the second wireless coverage area.

At step 508, in response to determining that the first WCD and second WCD are contending for the resource, the RAN may compare the historical call length data of the first WCD to the historical call length data of the second WCD. Based on a result of the comparison, the RAN may allocate the resource to the first WCD or the second WCD.

Comparing the historical call length data of the first WCD to the historical call data of the second WCD may involve comparing a statistical measure of the historical call length of the first WCD to the same statistical measure of the historical call length of the second WCD. For instance, this statistical measure may be an indicator of central tendency, such as an arithmetic mean, or a median. However, the RAN may consider other statistical measures, such as an indicator of variability like a standard deviation or an inter-quartile range.

Thus, for example, the RAN may compare the average historical call length of the first WCD to the average historical call length of the second WCD. If the first WCD exhibits a longer average historical call length, then the RAN may allocate the resource to the first WCD. Conversely, if the second WCD exhibits a longer average historical call length, then the RAN may allocate the resource to the second WCD.

To illustrate the advantages of this approach, suppose that both the first and second WCDs are contending for a resource in the preferred wireless coverage area, and are likely to be handed off to a non-preferred wireless coverage area if each respective WCD is not allocated the resource. Suppose further that each WCD will incur roaming fees of 10 cents per minute for calls conducted while using the non-preferred wireless coverage area. Then, if the first WCD has an average historical call length of five minutes, but the second WCD has an average historical call length of three minutes, roaming fees are likely to be reduced if the RAN allocates the resource to the first WCD.

If both WCDs exhibit average historical call lengths that are approximately equal, the RAN may look to other factors, such as historical call variability, to "break the tie." Thus, the RAN may compare the standard deviation of the first WCD's historical call length to the standard deviation the second WCD's historical call length. If the first WCD exhibits a larger standard deviation of historical of call length, then the RAN may allocate the resource to the first WCD. Conversely, if the second WCD exhibits a larger standard deviation of call length, then the RAN may allocate the resource to the second WCD.

If the resource is allocated to the first WCD, the RAN may transmit a call setup success response to the first WCD as per step 510. This response may be a message similar to the acknowledgement of step 314 or the response may take some other form. Further, after allocating the resource to the first WCD, the RAN may hand off the second WCD to the second non-preferred wireless coverage area.

It should be understood that flow charts 400 and 500 may contain more or fewer steps than shown herein, and that any step may be omitted without departing from the scope of the invention. Additionally, any step of flow chart 400 may be combined with any other step of flow chart 400. Similarly, any step of flow chart 500 may be combined with any other step of flow chart 500.

Further, flow chart 400 may be combined, in whole or in part, with flow chart 500. To that point, when a first WCD and a second WCD are contending for a resource of a preferred wireless coverage area, the RAN that controls the preferred wireless coverage area may consider the costs of handing off each WCD to a different non-preferred wireless coverage area. If these costs are the same or substantially similar, the RAN may then assign the resource based on the historical call length data of each WCD.

VII. CONCLUSION

Exemplary embodiments have been described above. Those skilled in the art will understand, however, that changes and modifications may be made to these embodiments without departing from the true scope and spirit of the invention, which is defined by the claims.

What is claimed is:

1. A method, performed by a radio access network (RAN) that provides a preferred wireless coverage area to serve wireless communications devices (WCDs), the method comprising:

the RAN receiving a first call setup request from a first WCD, wherein the RAN has access to historical call length data of the first WCD;

the RAN receiving a second call setup request from a second WCD, wherein the RAN has access to historical call length data of the second WCD;

in response to receiving the first call setup request and the second call setup request, the RAN determining that the first WCD and second WCD are contending for a resource of the preferred wireless coverage area;

in response to determining that the first WCD and second WCD are contending for the resource, the RAN comparing the historical call length data of the first WCD to the historical call length data of the second WCD; and based on a result of the comparison, the RAN allocating the resource to the first WCD.

2. The method of claim 1, further comprising:

in response to determining that the first WCD and second WCD are contending for the resource, the RAN determining that (i) without being allocated the resource, the first WCD is likely to begin roaming to a first non-preferred wireless coverage area, and (ii) without being allocated the resource, the second WCD is likely to begin roaming to a second non-preferred wireless coverage area.

3. The method of claim 2, further comprising:

the RAN determining that the second non-preferred wireless coverage area is approximately equally preferable to the first non-preferred wireless coverage area.

4. The method of claim 3, wherein determining that the second non-preferred wireless coverage area is approximately equally preferable to the first non-preferred wireless coverage area comprises:

determining that use of the second non-preferred wireless coverage area by the second WCD has an approximately equivalent cost as use of the first non-preferred wireless coverage area by the first WCD.

5. The method of claim 2, wherein the first non-preferred wireless coverage area is the second non-preferred wireless coverage area.

6. The method of claim 1, wherein the resource comprises a code division multiple access (CDMA) code.

7. The method of claim 1, wherein the resource is the only resource of a given type available in the preferred wireless coverage area.

8. The method of claim 1, further comprising:

after allocating the resource to the first WCD, the RAN transmitting a call setup success response to the first WCD.

9. The method of claim 1, further comprising:

after allocating the resource to the first WCD, the RAN handing off the second WCD to the second non-preferred wireless coverage area.

10. The method of claim 1, wherein comparing the historical call length data of the first WCD to the historical call data of the second WCD comprises comparing a statistical measure of the historical call length of the first WCD to a statistical measure of the historical call length of the second WCD.

11. The method of claim 1, wherein comparing the historical call length data of the first WCD to the historical call length data of the second WCD comprises comparing an average call length of the historical call length data of the first WCD to an average call length of the historical call length data of the second WCD.

12. The method of claim 1, wherein the result of the comparison is that the historical call length data of the first WCD exhibits longer call lengths than the historical call length data of the second WCD.

13. A radio access network (RAN) component capable of controlling a preferred wireless coverage area, the RAN component comprising:

a processor;

a data storage; and program instructions, stored in the data storage, that upon execution by the processor, cause the RAN component to (i) receive a first call setup request from a first WCD, wherein the RAN has access to historical call length data of the first WCD, (ii) receive a second call setup request from a second WCD, wherein the RAN has access to historical call length data of the second WCD, (iii) in response to receiving the first call setup request and the second call setup request, determine that the first WCD and second WCD are contending for a resource of the preferred wireless coverage area, (iv) in response to determining that the first WCD and second WCD are contending for the resource, the compare the historical call length data of the first WCD to the historical call length data of the second WCD, and (v) based on a result of the comparison, allocate the resource to the first WCD.

14. The RAN component of claim 13, further comprising:

program instructions, stored in the data storage, that upon execution by the processor cause the RAN component to, in response to determining that the first WCD and second WCD are contending for the resource, further determine that (i) without being allocated the resource, the first WCD is likely to begin roaming to a first non-preferred wireless coverage area, and (ii) without being allocated the resource, the second WCD is likely to begin roaming to a second non-preferred wireless coverage area.

15. The RAN component of claim 14, further comprising:

program instructions, stored in the data storage, that upon execution by the processor cause the RAN component to determine that the second non-preferred wireless coverage area is approximately equally preferable to the first non-preferred wireless coverage area.

16. The RAN component of claim 15, wherein determining that the second non-preferred wireless coverage area is approximately equally preferable to the first non-preferred wireless coverage area comprises determining that use of the second non-preferred wireless coverage area by the second WCD having an approximately equivalent cost as use of the first non-preferred wireless coverage area by the first WCD.

17. The RAN component of claim 13, wherein the resource comprises a code division multiple access (CDMA) code.

18. The RAN component of claim 13, wherein comparing the historical call length data of the first WCD to the historical call data of the second WCD comprises comparing a statistical measure of the historical call length of the first WCD to a statistical measure of the historical call length of the second WCD.

19. The RAN component of claim 13, wherein comparing the historical call length data of the first WCD to the historical call length data of the second WCD comprises comparing an average call length of the historical call length data of the first WCD to an average call length of the historical call length data of the second WCD.

20. The RAN component of claim 13, wherein the result of the comparison is that the historical call length data of the first WCD exhibits longer call lengths than the historical call length data of the second WCD.

* * * * *